US 6,594,303 B1

(12) United States Patent
Agrawal et al.

(10) Patent No.: US 6,594,303 B1
(45) Date of Patent: Jul. 15, 2003

(54) COHERENT DEMODULATOR FOR USE IN THE PRESENCE OF PHASE DISCONTINUITIES

(75) Inventors: Avneesh Agrawal, Sunnyvale, CA (US); Paul E. Bender, San Diego, CA (US); Luca Blessent, Solana Beach, CA (US); Brian K. Butler, La Jolla, CA (US); Quaeed Motiwala, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/228,470

(22) Filed: Jan. 11, 1999

(51) Int. Cl.$^7$ ................................. H04B 1/69
(52) U.S. Cl. .................. 375/145; 375/130; 375/143; 375/144; 375/146
(58) Field of Search ................ 375/350, 130, 375/144, 146, 143; 370/320, 339, 335

(56) References Cited

U.S. PATENT DOCUMENTS

| 5,751,721 | A | * | 5/1998 | Bloks ........................ 370/509 |
| 5,809,062 | A | * | 9/1998 | Hulbert ...................... 375/144 |
| 5,943,329 | A | * | 8/1999 | Ohgoshi et al. ............ 370/335 |
| 6,173,006 | B1 | * | 1/2001 | Kent et al. ................. 375/145 |

FOREIGN PATENT DOCUMENTS

| EP | 0353759 | 2/1990 |
| EP | 0810743 | 12/1997 |
| EP | 0848503 | 6/1998 |
| EP | 0901239 | 3/1999 |
| EP | 0984562 | 3/2000 |
| WO | 9826503 | 6/1998 |

* cited by examiner

Primary Examiner—Shuwang Liu
(74) Attorney, Agent, or Firm—Philip R. Wadsworth; Charles D. Brown; George C. Pappas

(57) ABSTRACT

Techniques for coherent demodulation in the presence of phase discontinuities is described. In the exemplary embodiment, times when phase discontinuities occur are known apriori by a receiver in which demodulation is being performed. In an alternate embodiment, the discontinuity location is signaled to the receiver in advance by the transmitter which generates the signals being demodulated. A pilot signal is prepared for optimal coherent demodulation by the use of two filters: one capable of withstanding the effects of phase discontinuity; a second providing superior filtering performance than the first so long as phase discontinuities are not present. Both filters are simultaneously operated. However, the superior performing filter is selected for use in demodulation whenever possible.

22 Claims, 5 Drawing Sheets

COHERENT DEMODULATOR FOR USE IN THE PRESENCE OF PHASE DISCONTINUITIES

BACKGROUND OF THE INVENTION

I. Field of the Invention

The present invention relates to communications. More particularly, the present invention relates to a novel and improved method and apparatus for demodulating coherent data in the presence of phase discontinuities.

II. Description of the Related Art

Wireless communication systems including cellular, satellite and point to point communication systems use a wireless link comprised of a modulated radio frequency (RF) signal to transmit data between two systems. The use of a wireless link is desirable for a variety of reasons including increased mobility and reduced infrastructure requirements when compared to wire line communication systems. One drawback of using a wireless link is the limited amount of communication capacity that results from the limited amount of available RF bandwidth. This limited communication capacity is in contrast to wire based communication systems where additional capacity can be added by installing additional wire line connections.

Recognizing the limited nature of RF bandwidth, various signal processing techniques have been developed for increasing the efficiency with which wireless communication systems utilize the available RF bandwidth. One widely accepted example of such a bandwidth efficient signal processing technique is the IS-95 over the air interface standard and its derivatives such as IS95-A and ANSI J-STD-008 (referred to hereafter collectively as the IS-95 standard) promulgated by the Telecommunication Industry Association (TIA) and used primarily within cellular telecommunications systems. The IS-95 standard incorporates code division multiple access (CDMA) signal modulation techniques to conduct multiple communications simultaneously over the same RF bandwidth. When combined with comprehensive power control, conducting multiple communications over the same bandwidth increases the total number of calls and other communications that can be conducted in a wireless communication system by, among other things, increasing the frequency reuse in comparison to other wireless telecommunication technologies. The use of CDMA techniques in a multiple access communication system is disclosed in U.S. Pat. No. 4,901,307, entitled "SPREAD SPECTRUM COMMUNICATION SYSTEM USING SATELLITE OR TERRESTRIAL REPEATERS", and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and incorporated by reference herein.

FIG. 1 provides a highly simplified illustration of a cellular telephone system configured in accordance with the use of the IS-95 standard. During operation, a set of subscriber units 10a–d conduct wireless communication by establishing one or more RF interfaces with one or more base stations 12a–d using CDMA modulated RF signals. Each RF interface between a base station 12 and a subscriber unit 10 is comprised of a forward link signal transmitted from the base station 12, and a reverse link signal transmitted from the subscriber unit. Using these RF interfaces, a communication with another user is generally conducted by way of mobile telephone switching office (MTSO) 14 and public switch telephone network (PSTN) 16. The links between base stations 12, MTSO 14 and PSTN 16 are usually formed via wire line connections, although the use of additional RF or microwave links is also known.

In accordance with the IS-95 standard each subscriber unit 10 transmits user data via a single-channel, non-coherent, reverse link signal at a maximum data rate of 9.6 or 14.4 kbits/sec depending on which rate set from a set of rate sets is selected. A non-coherent link is one in which phase information is not utilized by the received system. A coherent link is one in which the receiver exploits knowledge of the carrier signals phase during processing. The phase information typically takes the form of a pilot signal, but can also be estimated from the data transmitted.

A coherent reverse link CDMA system is described in co-pending application Ser. No. 08/654,443 entitled "HIGH DATA RATE CDMA WIRELESS COMMUNICATION SYSTEM", filed May 28, 1996, (hereinafter the '443 application) assigned to the assignee of the present invention and incorporated by reference herein. In this system, a set of individually gain adjusted subscriber channels are formed via the use of a set of orthogonal subchannel codes having a small number of PN spreading chips per orthogonal waveform period. In a preferred embodiment of this system, pilot data is transmitted via a first one of the transmit channels and power control data transmitted via a second transmit channel. The remaining two transmit channels are used for transmitting non-specified digital data including user data or signaling data, or both. The pilot channel carries a pilot signal which is used to determine phase information which allows demodulation of the data channels.

Before use in demodulation, the pilot signal must be filtered to remove as much transmission-introduced distortion as possible. Typically a low pass filter is used on the pilot signal. Well known in the art of digital signal processing are block filters. Also known are sliding window filters, which give superior performance to a block filters under certain circumstances. One important circumstance for the superior performance of sliding window filters is the lack of phase discontinuity.

Since the pilot signal exists to provide phase information, ideally no phase discontinuity will be present in the signal. However, as a practical matter, the use of cost efficient power amplifiers in the subscriber unit will introduce such phase discontinuities. A typical power amplifier of this type may be a piece-wise linear amplifier, which will produce a discontinuity every time the bias point is switched. Therefore there is a need to design demodulators which are capable of efficiently demodulating in the presence of phase discontinuities.

SUMMARY OF THE INVENTION

A novel and improved method and apparatus for coherent demodulation in the presence of phase discontinuities is described. In the exemplary embodiment of this invention, the times when phase discontinuities occur are known apriori by receiver in which demodulation is being performed. In an alternate embodiment, the discontinuity location is signaled to the receiver in advance by the transmitter which generates the signals being demodulated. The pilot signal is prepared for optimal coherent demodulation by the use of two filters: one capable of withstanding the effects of phase discontinuity; a second providing superior filtering performance than the first so long as phase discontinuities are not present. Both filters are simultaneously operated. However, the superior performing filter is selected for use in demodulation whenever possible. In the exemplary embodiment of the present invention, a sliding window filter is employed for the superior performing filter absent phase discontinuity and a block filter is employed for use when phase discontinuities are present. Only when the receiver detects that the sliding window filter will integrate over a phase discontinuity will the receiver select the output of the block filter rather than the output of the sliding window filter for use as the pilot signal employed in coherent demodulation.

This technique can be used whenever it can be known by the receiver the times when phase discontinuities are likely to occur. They may occur periodically and so the receiver can calculate when they will arrive. Alternatively a transmitter can signal when a phase discontinuity will occur. Similarly, if a transmitter signals following a phase discontinuity that such an event occurred, a receiver can compensate for this effect by delaying the demodulation by such time as necessary to account for the arriving phase discontinuity information.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A novel and improved method and apparatus for coherent demodulation in the presence of phase discontinuities is described in the context of the reverse link transmission portion of a cellular telecommunications system. While the invention is particularly adapted for use within the multipoint-to-point reverse link transmission of a cellular telephone system, the present invention is equally applicable to forward link transmissions. In addition, many other wireless communication systems will benefit by incorporation of the invention, including satellite based wireless communication systems, point to point wireless communication systems, and systems transmitting radio frequency signals via the use of co-axial or other broadband cables.

Figure 1:
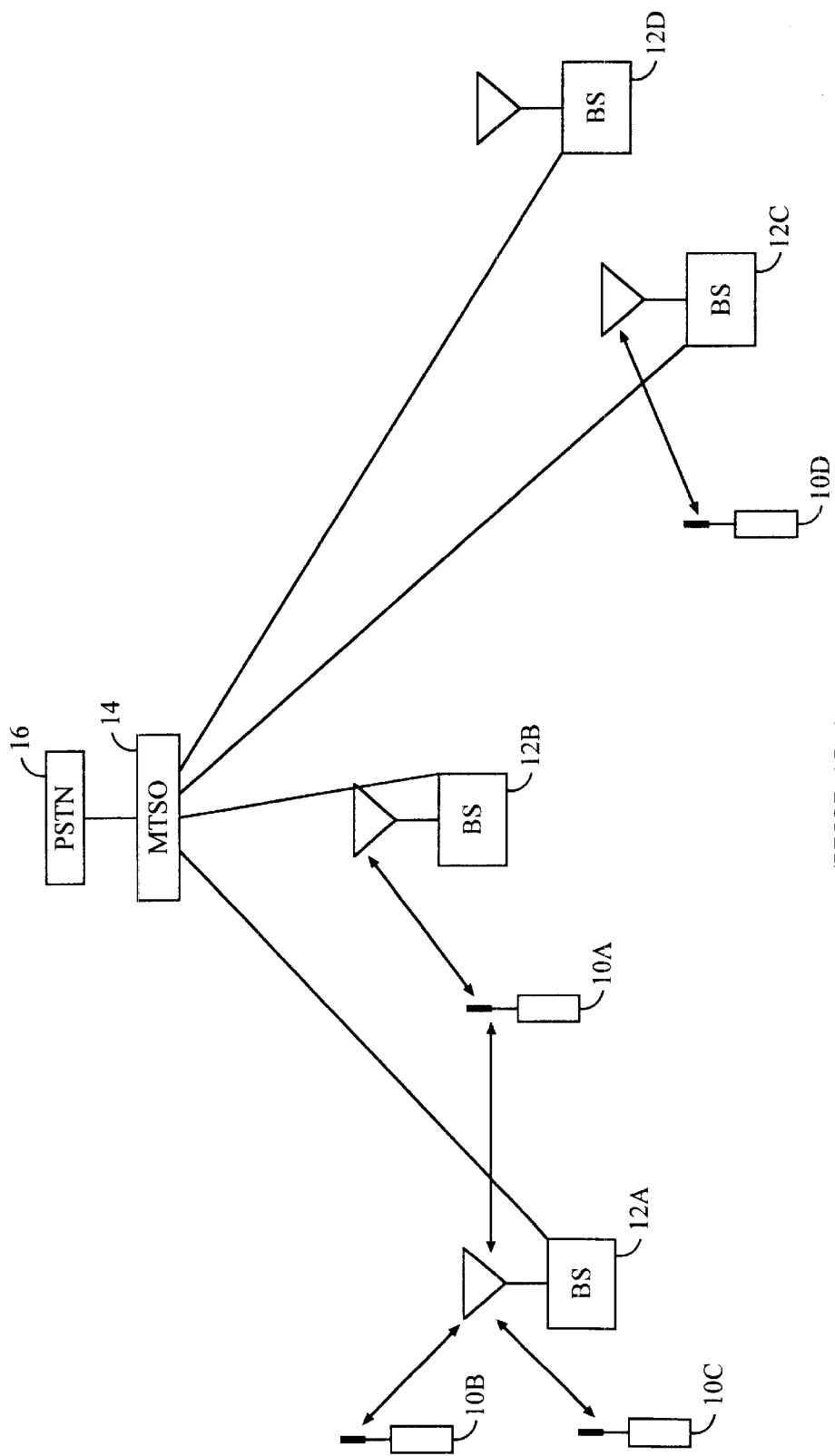
FIG. 1 is a block diagram of cellular telephone system.
Figure 2:
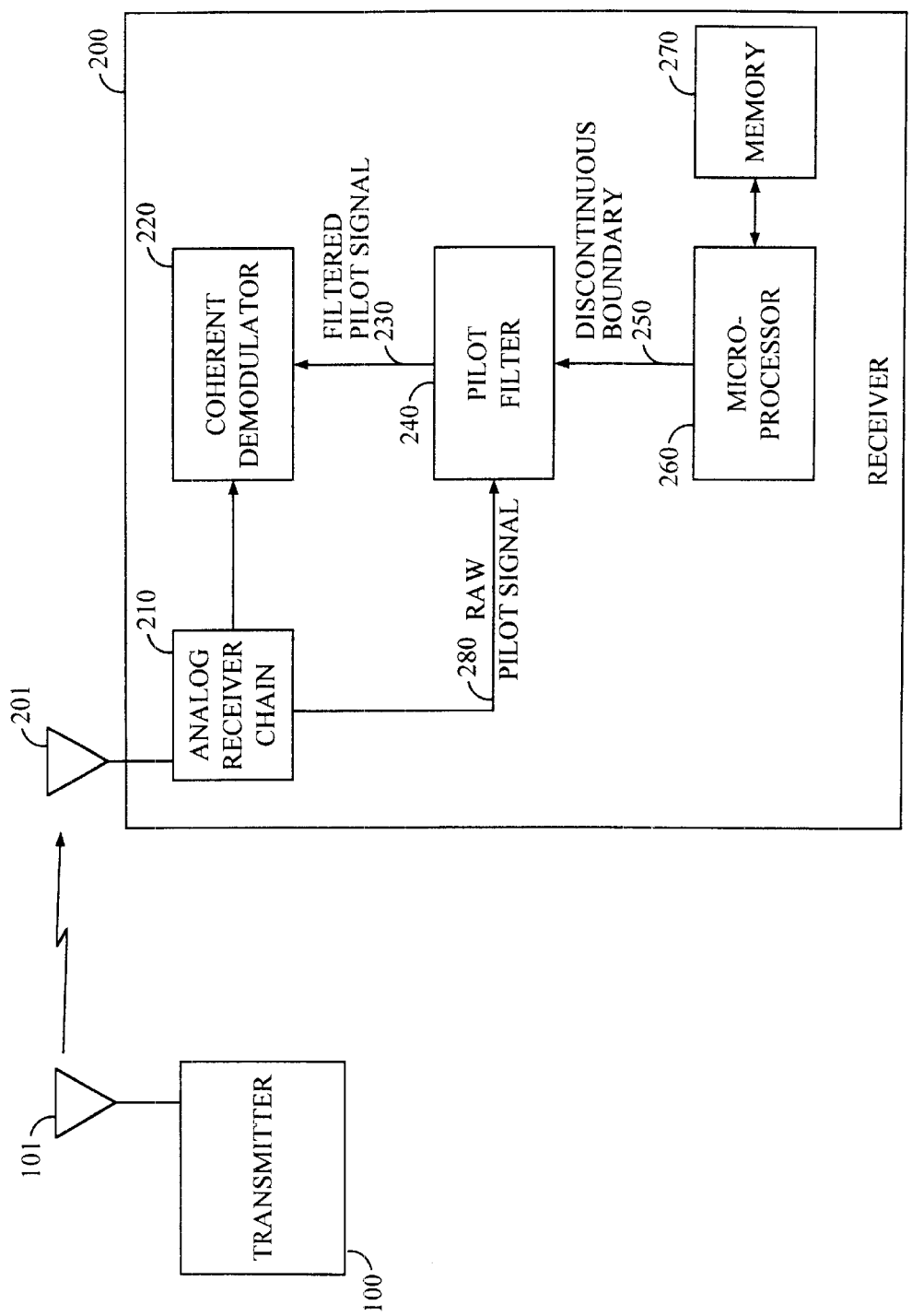
FIG. 2 is a block diagram of a transmitter and a receiver configured in accordance with the exemplary embodiment of the invention.

FIG. 2 is a block diagram of receive and transmit systems configured as a subscriber unit, or transmitter 100, and a base station, or receiver 200, in accordance with one embodiment of the invention. A pilot signal and related coherent data are transmitted via antenna 101 to receiver 200 where they are received via antenna 201. During typical operation, multiple subscribers will be in communication with a single base station. The modulation format of the signals in the exemplary embodiment of the invention is that disclosed in the aforementioned '443 application. The following description of receiver 200 is applicable to any coherent modulation system, as will become apparent to those skilled in the art.

The received signals from antenna 201 are processed in analog receiver chain 210. A typical analog receiver chain will have downconverters, filters, and perhaps IF mixers which will downconvert the modulated signals to baseband. Often the resulting signal will be converted to digital form, and some portion of the downconversion may be completed using digital signal processing techniques. Various techniques for accomplishing this downconversion process are known in the art and can be used in implementing the present invention.

Coherent demodulator 220 and pilot filter 240 are shown as separate blocks in FIG. 2. Each are shown to receive an output from analog receiver chain 210. The output from analog receiver chain 210 which is directed into pilot filter 240 is labeled raw pilot signal 280. Pilot filter 240 produces an output signal labeled filtered pilot signal 230, which is connected as an input to coherent demodulator 220. This configuration is not meant to suggest that the present invention is limited to discrete and separate blocks, but is as shown for the purpose of illustration of the present invention. Typically in practice, the functions of the coherent demodulator 220 and the pilot filter 240 may be incorporated in an entity known as a demodulator or other similar term known in the art. It will be apparent that these and other similar configurations are simply embodiments of the present invention.

Furthermore, raw pilot signal 280 needn't be a distinct signal from that which is sent to coherent demodulator 220 for demodulation. The configuration shows the general nature of the present invention. It may be convenient to separate a pilot from its data in analog receiver chain 210, but that is not a requirement. In a typical CDMA spread spectrum system, pilot signals are just one of the signal components which must be separated in the demodulator. In the preferred embodiment, described in the aforementioned '443 application, the output of analog receiver chain 210 will consist of the in-phase and quadrature components of the baseband received signal in digital form. Each sample of the these components are known as IQ pairs, and the same digital stream of IQ pairs is delivered to both pilot filter 240 and coherent demodulator 220.

Also shown in FIG. 2 are microprocessor 260 and memory 270, which are connected. Typically, a communication system, including a receiver or a transmitter, will have such a microprocessor to accomplish a number of functions for the operation of the communication system. Microprocessor 260, as shown, can be used for the sole purpose required for the present invention, but more likely will be used for other functions as well. A similar argument holds for memory 270 as well. For clarity, microprocessor 260 and memory 270 will only be described as necessary for understanding of the present invention, but techniques utilizing one or more microprocessors and one or more memories for a variety of tasks in a communication system are well known in the art. Microprocessor 260 acts in concert with memory 270 to perform functions or subroutines programmed therein. Those functions and subroutines will be described more fully in the following paragraphs. Alternatively, other special purpose hardware can be implemented to perform the functions described as being carried out by microprocessor 260, as will be apparent to those skilled in the art, and the result will simply be an alternative embodiment of the present invention.

In the present invention, microprocessor 260 produces an output, labeled "discontinuous boundary 250". This signal indicates the presence of an actual phase discontinuity, or alternatively can be used to signal when a phase discontinuity is permissible. In the exemplary embodiment, this signal is generated in a periodic fashion twice per frame on half frame boundaries. It is not known by the receiver whether there is in fact a phase discontinuity on each half frame boundary. But, these are the times when it is permissible for the transmitter to change power amplifier bias points (as defined in the specification), the result of which is likely to produce a phase discontinuity. Other algorithms can easily be employed in the present invention which use a different period, different boundaries, or other calculations appropriate to the type of coherent modulation being employed. These adaptations are all within the scope of the present invention and can be calculated by microprocessor 260, perhaps in conjunction with memory 270, or in equivalent special purpose hardware as described above.

Alternate embodiments employ various other techniques for generating signal discontinuous boundary 250. In one embodiment, transmitter 100 signals in advance to receiver 200 (through common signaling techniques not shown but readily available in the art) that a phase discontinuity is imminent and the location in time of the discontinuity. In another embodiment, the transmitter may not be capable of transmitting the location of a discontinuity until one has occurred. A system employing the present invention can be designed to account for this by utilizing such techniques as buffering to delay the processing of the incoming data, providing time to prepare for the discontinuity, culminating in activation of the signal labeled "discontinuous boundary 250". Both of these techniques have in common that discontinuous boundary 250 will only be activated when there truly is a discontinuity. Other similar variations of these will be readily apparent to one skilled in the art. These techniques are useful when further optimization via maximized use of a discontinuity-sensitive filter will yield substantial benefits. In the exemplary embodiment, discontinuous boundary 250 may be activated during some half frame boundaries which do not include a phase discontinuity, but the fraction of overall time that this adds to the use of a non-optimal discontinuity-insensitive filter is not significant.

Pilot filter 240 acts on raw pilot signal 280 in conjunction with discontinuous boundary 250 to produce filtered pilot signal 230. Filtered pilot signal 230 is connected as an input to coherent demodulator 220. It is used to coherently demodulate the baseband signal provided by analog receiver chain 210. In a coherent demodulation system, distortion in the pilot signal can lead to deleterious demodulation effects. The details of pilot filter 240 and its configuration in the present invention to combat those deleterious effects are described below.

Note that, as stated above, microprocessor 260 may be in control of other functions of the receiver, including demodulation. Although no connections are shown in this embodiment, it is implicit that if alternate phase discontinuity signaling techniques are employed, the information needed to create signal discontinuous boundary 250 can be relayed to microprocessor 260 (or any equivalent special circuitry used instead).

Figure 3:
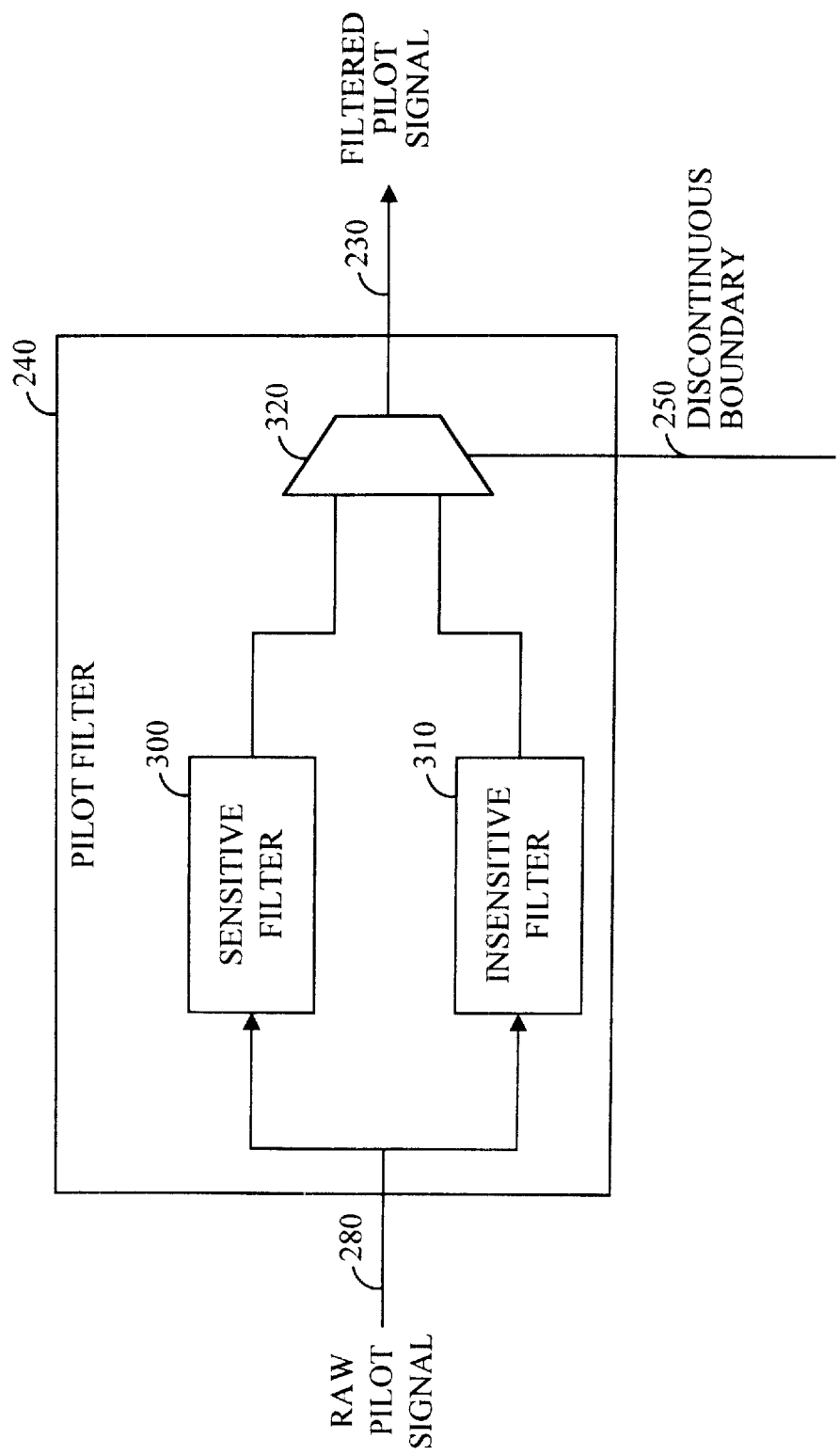
FIG. 3 is a block diagram of a pilot filter configured in accordance with the exemplary embodiment of the invention.

FIG. 3 provides more details of pilot filter 240. Raw pilot signal 280 enters pilot filter 240 and connects to the input of two different filters, labeled sensitive filter 300 and insensitive filter 310. The meaning of sensitive and insensitive in this context is sensitivity by the filter to phase discontinuities. The present invention achieves an increase in performance when the sensitive filter is a filter chosen such that it provides superior pilot filtering performance than the insensitive filter whenever no phase discontinuities are present. Naturally, as a correlary, the insensitive filter will provide superior pilot filtering performance to the sensitive filter when phase discontinuities are present, but inferior performance otherwise. In the exemplary embodiment, sensitive filter 300 is chosen to be a sliding window filter and insensitive filter 310 is chosen to be a block filter.

The outputs of both sensitive filter 300 and insensitive filter 310 are connected as inputs to multiplexor 320. Multiplexor 320 is controlled by discontinuous boundary 250 to select the output of sensitive filter 300 for delivering on the output filtered pilot signal 230 whenever discontinuous boundary 250 is inactive. When discontinuous boundary 250 is active, signifying that a phase discontinuity is present or allowed to be present, the output of insensitive filter 310 is selected for output by multiplexor 320 for output onto the output filtered pilot signal 230. In the exemplary embodiment, the sliding window filter will not perform well when it performs integration over a discontinuity. Therefore, discontinuous boundary 250 will always be activated to select the output of the block filter whenever integration over a discontinuity would occur. At all other times, the output of the sliding window filter will be selected.

An alternative filtering technique is to employ a sliding window filter with variable window size, such that the window size can be reduced as a discontinuity approaches and increased following its occurrence to allow the use of the sliding window filter for a larger fraction of time.

It will be clear to those skilled in the art that a number of filters greater than two can be employed within the scope of the present invention. This will be useful whenever there are more than two filters, each of which provide an optimal pilot filtering under a unique set of the possible circumstances. It follows that the signal discontinuous boundary 250 will contain enough information to determine which of the available filters is optimal under the circumstances. In a digital system, this means that a multi-bit signal is used instead of a single bit signal as the select input of multiplexor 320. Other similar control mechanisms which are well known in the art will also fall into the scope of the present invention.

Figure 4:
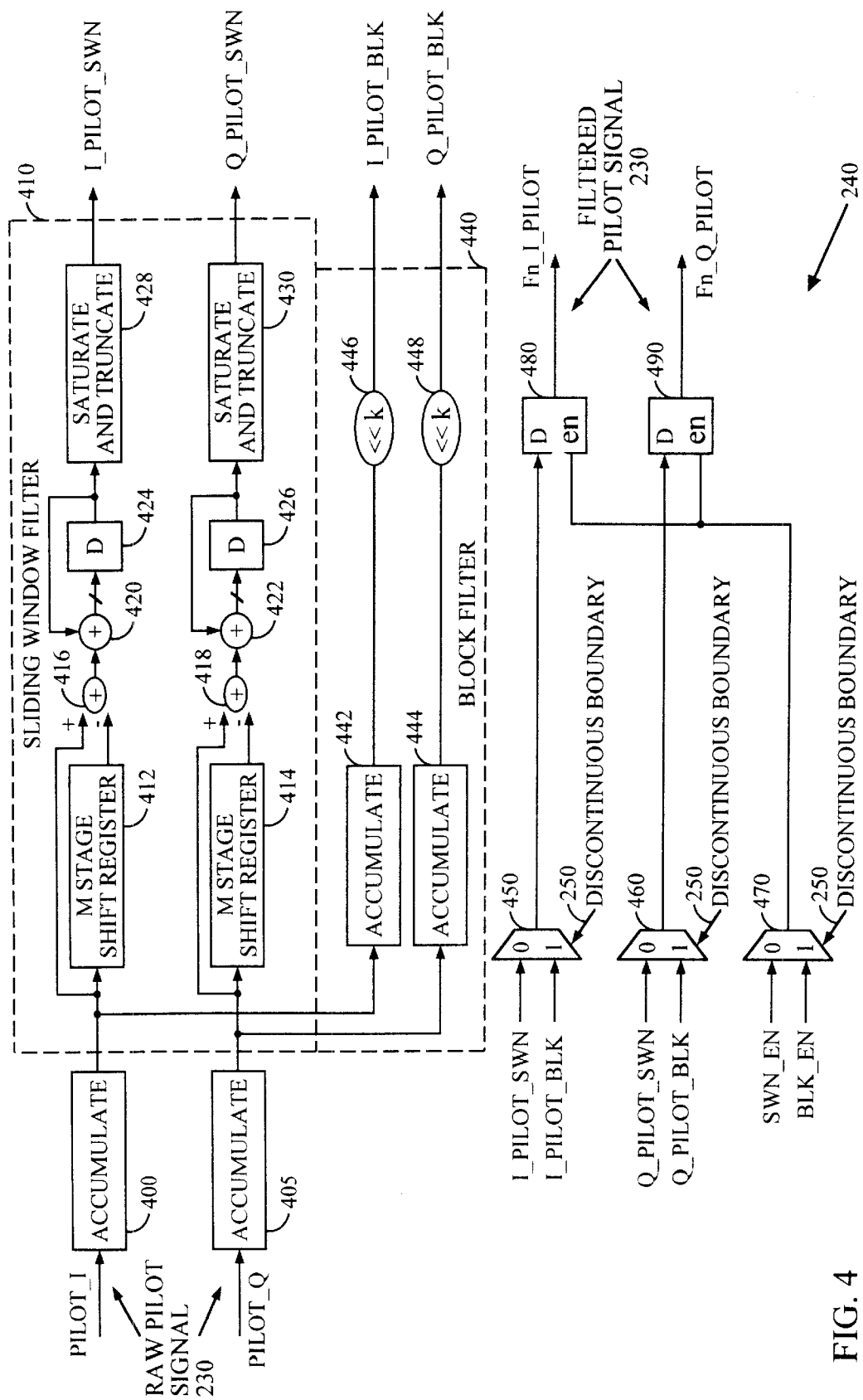
FIG. 4 is a more detailed block diagram of a pilot filter configured in accordance with the exemplary embodiment of the invention.

FIG. 4 shows the exemplary embodiment of pilot filter 240. As stated previously, the phase discontinuity sensitive filter employed is a sliding window filter, and the phase discontinuity insensitive filter employed is a block filter. These two filters operate in parallel, as will be described.

Raw pilot signal 280 comes in as an IQ pair, labeled Pilot_I and Pilot_Q, as described above. Accumulators 400 and 405 are optional. They are employed to integrate and sub-sample the incoming raw pilot samples. In the exemplary embodiment, the integration is over 256 chips. Other periods of integration could be chosen, for example integration over 64 chips would yield a sample for every symbol of data. The memory requirements for the sliding filter are affected by the choice of sub-sampling.

Sliding window filter 410 in the exemplary embodiment uses a window with constant amplitude. This makes the filtering computation a simple integrate function. Other window shapes can be chosen, as is known in the art, but those 30 will require multiplication as well as addition. The memory is deployed as two M stage shift registers 412 and 414, one for the in-phase path and one for the quadrature-phase path, respectively. The size of this memory is dependent on the sampling rate described above. A sliding window filter integrates over a period of time with each new output of the filter consisting of the integration of the previous result added to a new sample and from that result the oldest sample must be removed. In this manner, the window slides across the samples one sample at a time. This filter will continually operate its sliding functionality, even when the integration includes data with a phase discontinuity in it. Obviously, the results will be quite suboptimal during those periods. For example, a 180 degree phase shift in the middle of a pilot stream can yield an output of zero. The present invention avoids these deleterious effects by ignoring the output of this sliding window filter during those times when the data is unreliable due to the presence of phase discontinuities.

In adders 416 and 418, the oldest samples which come out of the M stage shift registers 412 and 414 are subtracted from the new samples arriving from accumulators 400 and 405. The current filter accumulations for the in-phase and quadrature pilot paths are stored in registers 424 and 426 respectively. These results are updated through adders 420 and 422 by summing the current accumulation values with the difference calculated in adders 416 and 418. In many embodiments, such as this one, it may be desirable to saturate and truncate values to specific ranges and bit widths for implementation specific reasons. This is optional, and is shown in saturate and truncate blocks 428 and 430. The I and Q outputs from the sliding window are shown and labeled as I_PILOT_SWN and Q_PILOT_SWN, respectively.

Block filter 440 employs I and Q accumulators 442 and 444. In the exemplary embodiment, these accumulators operate over 1.25 ms boundaries. Each 1.25 ms boundary includes a power control group, and an integer number of power control groups fit into half-frame boundaries. As stated previously, the phase discontinuities are allowed to occur only on half frame boundaries. A block filter operates by integrating over a block of data, and that block of data should also be chosen so as not to integrate over a discontinuity, for the reasons described. The careful selection of periods for integration assure that this will not occur. It will be clear to one skilled in the art that the periods chosen are only a subset of the possible periods that could be employed in the present invention. Many permutations of the same invention will be clear. For example, the blocks integrated over in the block filter do not need to be periodic. Further, a filter other than a simple integrator filter can easily be used.

Shifters 446 and 448 are optional. They are used in the exemplary embodiment to left shift by k bits to provide scaling. The scaling factor k in this embodiment is the ratio of the sliding window length divided by the block window length. The periods used are not mandatory. In this example the sliding window period is 2.5 ms and the block filter period is 1.25 ms. The I and Q outputs are labeled I_PILOT_BLK and $Q_{13}$ PILOT_BLK, respectively.

The outputs of the sliding window filter, I_PILOT_SWN and Q_PILOT_SWN, and the outputs of the block filter, I_PILOT_BLK and Q_PILOT_BLK, are input into multiplexors 450 and 460, as shown. Signal discontinuous boundary is used, as described above, to select between the sliding window filter's outputs and the block filter's outputs. The results are presented to the inputs of registers 480 and 490, as shown. These registers are enabled by the output of multiplexor 470, which selects the enable signal at the proper frequency for the sliding window filter, SWN_EN, or the enable signal at the proper frequency for the block filter, BLK_EN. The selection is controlled by signal discontinuous boundary 250. The outputs of registers 480 and 490 provide the filtered pilot signal 230, labeled in this embodiment as I_PILOT and Q_PILOT. The registers as shown in this configuration are illustrative in nature only. Those skilled in the art will be able to configure the present invention in a variety of implementations of circuits interfacing with the pilot filter.

Figure 5:
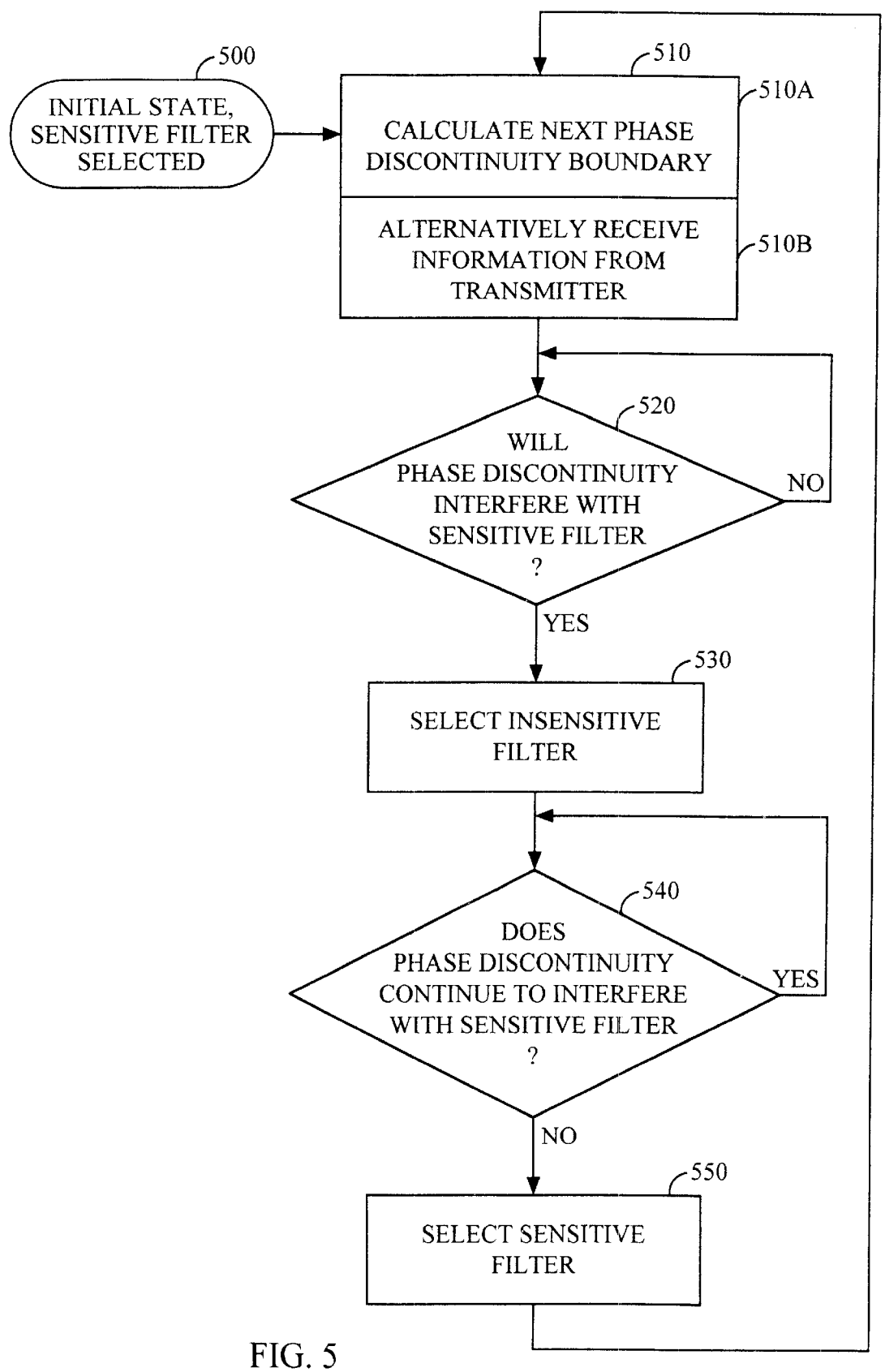
FIG. 5 is a flow diagram detailing the steps to perform the present invention.

FIG. 5 is a flowchart depicting the steps to perform the present invention. Block 500 defines the initial state where the output of the sensitive filter is selected. In practice, at the beginning of a communication session it may be required that an initialization sequence is followed whereby the insensitive filter is used to initialize the session. When this initialization is complete, the steady state, most optimal selection will be the selection of the sensitive filter and that is where the flowchart begins. Proceed from this initial state to block 510 which is shown containing alternate blocks including block 510A, where the next phase discontinuity boundary is calculated, and block 510B, where the boundary information is received from the transmitter. In the exemplary embodiment, block 510A is employed as block 510, but it is envisioned that either 510A, 510B, or a combination of both can be employed in block 510. Once a boundary is known, the determination is made in block 520 whether the discontinuity is presently just about to interfere with the operation of the sensitive filter, meaning that it will no longer be the optimal choice among the available filters. If this condition is not yet met, the flow will continuously loop back to block 520 until such time as it is met. Then proceed to block 530 and select the insensitive filter. Proceed to block 540. Determine whether the phase discontinuity continues to interfere with the sensitive filter in such a manner as to cause it to continue to be sub-optimal in comparison to the insensitive filter. So long as this condition persists, loop back to block 540. Once this condition is no longer true, select once more the sensitive and more optimal filter and return back to block 510 to await and/or calculate the next phase discontinuity.

Thus, a method and apparatus for coherent demodulation in the presence of phase discontinuities has been described. The description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A communication system for use in the presence of phase discontinuities in a pilot signal comprising:
   a transmitter for transmitting a signal having the pilot signal;
   a receiver for receiving said signal, said receiver having:
      a first filter for filtering said pilot signal;
      a second filter for filtering said pilot signal wherein said second filter provides superior performance than said first filter when phase discontinuities are absent in said pilot signal; and
      a selector for selecting the output of said second filter when phase discontinuities are not present in said pilot signal, selecting the output of said first filter when phase discontinuities are present in said pilot signal, and providing said selected output for use in demodulation.

2. The communication system of claim 1 wherein the locations of the phase discontinuities in said pilot signal are limited in their occurrence to periodic boundaries which are known to said receiver apriori.

3. The communication system of claim 2 wherein said first filter is a block filter and said second filter is a sliding window filter.

4. The communication system of claim 1 wherein said first filter is a block filter and said second filter is a sliding window filter.

5. The communication system of claim 1 wherein the locations of the phase discontinuities are transmitted from said transmitter to said receiver.

6. The communication system of claim 5 wherein said first filter is a block filter and said second filter is a sliding window filter.

7. A receiver for coherently receiving a pilot signal comprising:
- a first filter for filtering said pilot signal;
- a second filter for filtering said pilot signal wherein said second filter provides superior performance than said first filter when phase discontinuities are absent in said pilot signal; and
- a selector for selecting the output of said second filter when phase discontinuities are not present in said pilot signal, selecting the output of said first filter when phase discontinuities are present in said pilot signal, and providing said selected output for use in demodulation.

8. The receiver of claim 7 further comprising a processor for determining the location of phase discontinuities and controlling the output of said selector.

9. The receiver of claim 8 wherein said first filter is a block filter and said second filter is a sliding window filter.

10. The receiver of claim 7 wherein said first filter is a block filter and said second filter is a sliding window filter.

11. The receiver of claim 7 further comprising a demodulator for receiving said selected output.

12. A pilot filter comprising:
- a first filter for processing a pilot signal;
- a second filter for processing said pilot signal in parallel with said first filter, wherein said second filter provides superior performance than said first filter when said pilot signal does not contain phase discontinuities; and
- a multiplexor for outputting the output of said second filter in response to a select signal indicating the lack of phase discontinuities in said pilot signal and for outputting the output of said first filter in response to said select signal indicating the presence of phase discontinuities in said pilot signal.

13. The pilot filter of claim 12 wherein said first filter is a block filter and said second filter is a sliding window filter.

14. The pilot filter of claim 13 wherein said block filter is an integrator and said sliding window filter is a sliding integrator.

15. The pilot filter of claim 14 wherein said sliding integrator comprises:
- a shift register for storing a window length of samples by storing each incoming sample; and
- an accumulator for accumulating said incoming sample and subtracting the oldest sample in said shift register.

16. A method for filtering a pilot signal in a communication system comprising the steps of:
simultaneously filtering the pilot signal with a pilot filter having a first filter and a second filter, wherein said second filter provides superior performance than said first filter in the absence of phase discontinuities in said pilot signal;

calculating a phase discontinuity location and producing a select signal which indicates when the discontinuity may interfere with the performance of said second filter;

selecting for the output of the pilot filter the output of said second filter when said select signal is asserted; and selecting for the output of the pilot filter the output of said first filter when said select signal is not asserted.

17. A method for filtering a pilot signal in a communication system comprising the steps of:
a) simultaneously filtering the pilot signal with a pilot filter having a first filter and a second filter, wherein said second filter provides superior performance than said first filter in the absence of phase discontinuities in said pilot signal;
b) receiving a phase discontinuity location and producing a select signal which indicates when the discontinuity may interfere with the performance of said second filter;
c) selecting for the output of the pilot filter the output of said second filter when said select signal is asserted; and
d) selecting for the output of the pilot filter the output of said first filter when said select signal is not asserted.

18. A communication system for use in the presence of phase discontinuities in a pilot signal comprising:
- a transmitter for transmitting a signal having the pilot signal;
- a receiver for receiving said signal, said receiver having:
  - a first filter for filtering said pilot signal;
  - a second filter for filtering said pilot signal wherein said second filter provides superior performance than said first filter when phase discontinuities are absent in said pilot signal; and
  - a selector for selecting depending on a determination of whether phase discontinuities are present, between the output of said second filter and the output of said first filter and providing the selected output for use in demodulation.

19. The communication system of claim 18 wherein said selector selects the output of said second filter when phase discontinuities are not present in said pilot signal and selects the output of said first filter when phase discontinuities are present in said pilot signal.

20. The communication system of claim 19 wherein the phase discontinuities occur at predetermined times.

21. The communication system of claim 20 wherein said phase discontinuities occur periodically.

22. The communication system of claim 19 wherein the locations of phase discontinuities are transmitted from said transmitter to said receiver.

* * * * *